United States Patent Office 2,731,441
Patented Jan. 17, 1956

2,731,441

STABILIZATION OF VINYL CHLORIDE RESINS WITH ORGANOTIN MERCAPTIDES OF 2-MERCAPTOTHIAZOLE AND ITS DERIVATIVES

Eugene P. Stefl, Churchill Valley, Pa., and Chris E. Best, Franklin Township, Summit County, Ohio, assignors to The Firestone Tire & Rubber Company, Akron, Ohio, a corporation of Ohio No Drawing. Application September 6, 1951,
Serial No. 245,417

18 Claims. (Cl. 260—45.75)

This invention relates to the stabilization, against deterioration by heat, of vinyl chloride polymer and copolymer resins, and more particularly to the stabilization of such resins under extremely drastic and nonconventional conditions of temperature and mechanical working during calendering operations carried out thereon.

Vinyl chloride polymer and copolymer resins, being thermoplastic, are commonly heated to soften them during fabrication by extrusion, calendering and like operations. Such heating is limited in degree and duration by the tendency of the resins to decompose. A number of stabilizing agents, more or less effective, have been proposed for incorporation into vinyl chloride resins to inhibit such deterioration; however, none of these proposed materials have been entirely satisfactory. Particularly, investigations by the applicant's associates have indicated that it would be highly desirable to calender vinyl chloride resins at somewhat higher temperatures (say on the order of 315°–350° F., and even, for brief intervals, at temperatures on the order of 380°–400° F.) rather than the somewhat lower temperatures now employed for this purpose, as the higher temperatures would result in better fusion of the film as reflected in improved clarity, tear strength, tensile strength and flexibility. Higher temperatures also permit the calenders to be operated at much higher speeds, thereby greatly reducing the cost of converting the basic resins to film and other sheetings. None of the stabilizers proposed in the prior art, with the possible exception of certain lead compounds, have been sufficiently reliable in the higher range of temperature to be practical, and accordingly commercial films calendered from compositions containing conventional stabilizers fall short of ideal properties of transparency, mechanical strength, and flexibility. The lead compounds, however, discolor badly when exposed to even minute concentrations of hydrogen sulfide, such as may occur in the vicinity of elastic rubber bands used in refrigerator dish covers made from vinyl films. In addition to aiming at stabilization at the more ideal higher range of temperatures, a stabilizer must fulfill a number of other essential and rather exacting requirements; the stabilizer must be effective over considerable periods of time, for instance as long as 30 minutes; and the stabilizer must not adversely affect the color, transparency or odor of the film produced. A low degree of toxicity and allergenic action is also desirable in such stabilizers.

Accordingly it is an object of this invention to provide novel heat stabilizers for vinyl chloride polymer and copolymer resins.

Another object is to provide heat stabilizers for such resins which will be effective at higher temperatures, and for longer periods of time, than any other substances heretofore proposed for this purpose.

A further object is to provide such heat stabilizers which will be effective in stabilizing vinyl chloride resins on the calender at temperatures in the range 315°–350° F., for extended periods of time such as 30–60 minutes.

A further object is to provide stabilizers for vinyl chloride resins which will not adversely affect the color, clarity, transparence or odor of films and other products made therefrom.

A still further object is to provide stabilizers for vinyl chloride resins which will not be subject to discoloration in the presence of hydrogen sulfide.

A still further object is to provide such stabilizers which are non-toxic and non-allergenic.

SYNOPSIS OF THE INVENTION

The above and other objects are secured, in accordance with this invention, by the incorporation, into a vinyl chloride polymer or copolymer resin formulation, of from 0.25 to 5.0% of an organotin mercaptide of the formula

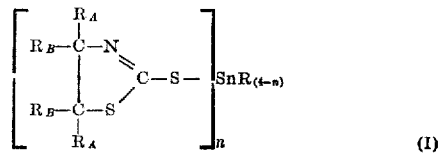

wherein:

$n$ is an integer, either 2 or 3;

R, independently in each occurrence, represents an organic radical consisting of from 1 to 22 carbon atoms, hydrogen, carbon-carbon single bonds, carbon-hydrogen bonds (optionally), aromatic ring carbon-carbon double bonds and (also optionally) a maximum total of four innocuous structures such as carbon-carbon triple bonds, aliphatic carbon-carbon double bonds, ether linkages, thioether linkages, carboxylic ester groups bonded to carbon atoms, fluorine atoms bonded to carbon atoms, and halogen atoms linked to aromatic ring carbon atoms;

$R_A$, independently in each occurrence, represents a hydrogen atom or an alkyl, cycloalkyl, aryl, aralkyl, furfuryl or tetrahydrofurfuryl group; or two symbols $R_A$ on adjacent carbon atoms together represent a hydrocarbon chain forming, with the said two adjacent carbon atoms, a cyclic structure and $R_B$, independently in each occurrence, represents a hydrogen atom; or an alkyl, cycloalkyl, aryl, aralkyl, furfuryl or tetrahydrofurfuryl group; or two symbols $R_B$ on two adjacent carbon atoms together represent an additional bond, so that the said two adjacent carbon atoms are double bonded.

In the above and all following formulae, the atoms in the groups R attached to the tin atoms must always be carbon atoms. It will also be understood that the innocuous groups mentioned as optional constitutents of the radicals R need not all be identical in any given radical R, but their total number, enumerated without regard as to kind of innocuous group, must not exceed four in any given radical R.

The compounds may conveniently be prepared by reacting 2-mercaptothiazole derivatives of the formula

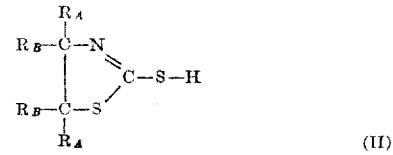

with diorganotin oxides or with organostannic acids of the formulae

or

all under the notation given above in connection with Formula I. Water is eliminated, with formation of the desired organotin mercaptide.

THE SUBSTITUENT R

The groups R in the above formulae may be substantially any substituents which (a) are not too large for convenient synthesis and reactivity and (b) do not contain any groups which will interfere with the synthesis or existence of the compound. It will be understood, of course, that the atoms in the groups R attached to the tin atoms must be carbon atoms. In practice, a range of from 1 to 22 carbon atoms in each of the radicals R will cover the field of radicals which will be conveniently available and which will not be too large to be readily reactable in the synthesis of the stabilizers of this invention. The radicals R may be, and from the standpoint of ready procurement and avoidance of complications in synthesis preferably are, simple monovalent hydrocarbon radicals containing only single bonds or aromatic ring double bonds between the carbon atoms, for instance alkyl, cycloalkyl, aryl, aralkyl, alkaryl and like monovalent hydrocarbon radicals containing from 1 to 22 carbon atoms. Likewise, these radicals, in addition to simple hydrocarbon structures, may contain various other groupings which are sufficiently low in number, and of sufficiently non-reactive character, as not to interfere with the synthesis of the stabilizers of this invention. Structures which have been found innocuous and non-interfering are inter alia, aliphatic ethylenic linkages (as distinguished from the unsaturated bonds in aromatic rings, which may be present in numbers limited only by the size of the radical R in question i. e., from 3 to 11 such double bonds), acetylenic linkages, ether linkages, thioether linkages, carboxylic ester linkages, fluorine atoms bonded to carbon atoms, and halogen atoms bonded to aromatic ring carbon atoms. Of all the radicals coming within the ambit of the symbol R as above defined, the simple hydrocarbon radicals containing a total of not more than four non-aromatic ethylenic linkages and acetylenic linkages will be preferred, as the starting materials for these compounds will be most readily accessible, and less complications will be encountered in the synthetic steps leading to the stabilizers of this invention.

The radical R is brought into the stabilizer compounds of this invention with the diorganotin oxide (III) or the organostannic acid (IV). Suitable specific tin compounds for this purpose include inter alia:

Table I

Diorganotin oxides (III):
  Dimethyltin oxide
  Diethyltin oxide
  Diisobutyltin oxide
  Di(n-butyl)tin oxide
  Di(n-hexyl)tin oxide
  Di(2-ethylhexyl)tin oxide
  Dilauryl tin oxide
  Tin oxide containing mixed alkyl groups derived from cocoanut oil
  Di-hexadecyl tin oxide
  Diphenyltin oxide
  Di-α-naphthyl tin oxide
  Phenyl ethyl tin oxide
  Di(2-thienyl)tin oxide
  Difuryltin oxide
  Dixenyltin oxide
  Di(ethoxyethyl)tin oxide
Organostannic acids (IV):
  n-Butylstannic acid
  Isobutylstannic acid
  n-Hexylstannic acid
  2-ethylhexylstannic acid
  Laurylstannic acid
  Mixed alkylstannic acids containing alkyl groups derived from cocoanut oil
  Hexadecylstannic acid
  Phenylstannic acid
  (2-thienyl)stannic acid
  Furylstannic acid
  Xenylstannic acid
  Ethoxyethylstannic acid

THE RADICALS $R_A$ AND $R_B$

As above noted, these radicals may be hydrogen atoms, or hydrocarbon radicals such as alkyl, cycloalkyl or aryl radicals, or furfuryl or tetrahydrofurfuryl groups. In addition, the two symbols $R_A$ on any pair of adjacent carbon atoms may together represent a hydrocarbon chain completing a ring with the two carbon atoms. Likewise the two symbols $R_B$ on any pair of adjacent carbon atoms may together represent a bond so that the two carbon atoms are double bonded. These groups $R_A$ and $R_B$ are brought into the compounds of this invention as constituents of the mercaptothiazole derivative of Formula II which will be seen to be a class of mercaptans produced by oxidative or disproportionative condensation between carbon disulfide and various amines and anilines. Representative 2-mercaptothiazole derivatives are, inter alia.

Table II 2-mercaptobenzothiazole
2-mercaptothiazolene
2-mercaptothiazole
Tetrahydro-2-mercaptobenzothiazole
(o-Phenyl) 2-mercaptobenzothiazole
4-methyl-2-mercaptothiazole
4,5-dimethyl-2-mercaptothiazole
4-ethyl-2-mercaptothiazole
2-mercaptonaphthothiazole

THE SYNTHESIS OF THE STABILIZER COMPOUNDS EMPLOYED IN THIS INVENTION

The compounds employed in this invention may conveniently be prepared by reacting a diorganotin oxide or an organostannic acid with a 2-mercaptothiazole derivative. In the case of the diorganotin oxides, the reaction is as follows:

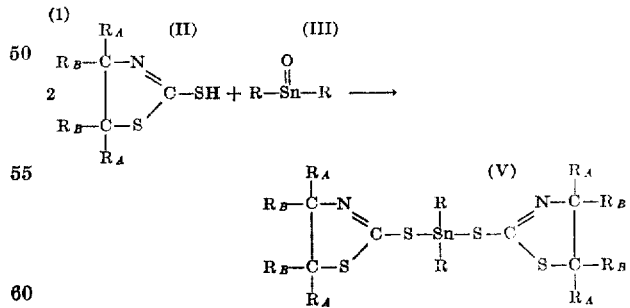

In the case of the organostannic acids the reaction is as follows:

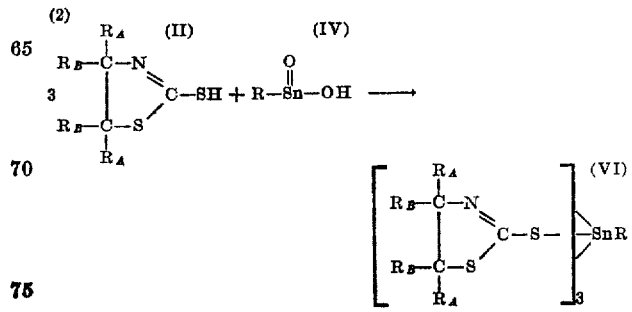

Both reactions (1) and (2) employ the notation given above the Formula I, and it will be seen that the products (V) and (VI) are special cases of Formula I, in which $n$ represents 2 and 3 respectively: the reaction may be carried out by simply fusing the reactants (II) and (III), or (II) and (IV), together, with heating at temperatures in the range 80°–200° C., it being understood that the temperature must be high enough to fuse the reactants involved, and to evaporate the water at the prevailing pressure (subatmospheric if the temperature is below 100° C.). Alternatively, the reaction may be carried out in the presence of a liquid medium, which may be a solvent for one or both of the reactants. Hydrocarbon solvents such as benzene, toluene and the like are well adapted for this purpose, since they boil in a range at which they may conveniently be refluxed to entrain and remove the water produced in the reaction. Likewise, the final product (I) is generally soluble in these solvents, whereas usually the mercaptothiazole derivative (II) and organotin oxide (III) or organostannic acid are insoluble, so that the final reaction mixture can be freed of unreacted material by filtration.

The stabilizers employed in this invention may also be prepared by reacting a sodium, potassium or other alkali metal salt of a mercaptan of the Formula II above with an organostannic di- or trihalide of the respective formulae $$R_2 SnCl_2 \text{ (VI) or } R SnCl_3 \text{ (VIII)}$$

under the notation of Formula I above. The reaction may be carried out by mixing the reactants together, if desired in the presence of an inert liquid reaction medium. The product may be recovered by filtering off the insoluble alkali chlorides.

With regard to the account of organotin mercaptides to be incorporated into vinyl chloride resins to be stabilized in accordance with this invention, amounts of these compounds as low as 0.2%, based on the weight of vinyl chloride resin in the composition, will definitely enhance the resistance thereof to deterioration by heat and mechanical working. Generally, from about 1% to 3%, of the stabilizing compounds, based on the weight of vinyl chloride resin in the composition, will be preferred. Greater quantities, up to about 5%, may be employed, but usually no great additional advantage will be obtained from the increased quantities.

THE VINYL CHLORIDE RESINS TO BE STABILIZED IN ACCORDANCE WITH THIS INVENTION

The vinyl chloride resins are a well-known class of materials consisting of simple polymers of vinyl chloride, and copolymers of vinyl chloride in which the essential polyvinyl chloride polymer chains are interspersed at intervals with the residues of other monoethylenically unsaturated compounds or conjugated diethylenically unsaturated compounds. In general, any resins having a substantial proportion of the polyvinyl chloride chain structure, so as to be susceptible to heat degradation by mechanisms involving the polyvinyl chloride chain, will be benefitted by the addition of the stabilizers of this invention. This will include any vinyl chloride copolymers containing not more than 40%, based on the total weight of the resins, of these extraneous unsaturated compounds. Conversely stated, the resins must contain at least 60% of vinyl chloride copolymerized therein. Suitable compounds for copolymerization with vinyl chloride include, for instance, vinyl esters on the order of vinyl bromide, vinyl fluoride, vinyl acetate, vinyl chloroacetate, vinyl butyrate, other fatty acid vinyl esters, vinyl alkyl sulfonates and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate, and the like; vinylidene compounds on the order of vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene divinyl ketone and the like. For a fairly complete list of materials known to polymerize with vinyl chloride, reference may be had to Krczil "Kurzes Handbuch der Polymerizations Technik, II: Mehrstoff Polymerization," Edwards Bros. Inc., 1945, pp. 735–747, the items under "Vinyl chloride." As a rough rule, the criterion of a practical comonomer for use with vinyl chloride to produce cooplymers containing 60% or more of vinyl chloride is that, on a mole percentage basis, an initial charge of 96% vinyl chloride, balance comonomer, shall yield an initial copolymer containing (a) at least 90% vinyl chloride, and (b) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride

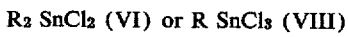

$$4.1 > \frac{.029 e^{-.3(.3-e_2)}}{1.33 Q_2 e^{e_2(.3-e_2)} + .96} + .04 > .37$$

Instead of the single unsaturated comonomers of the types above indicated, mixtures of such comonomers may enter into the copolymers, it being understood that the total quantity thereof shall be small enough (i. e., not over 40%, based on the weight of copolymer) that the essential character of the polyvinyl chloride chain is retained.

PROCESSING OF THE COMPOSITIONS OF THIS INVENTION

The compositions of this invention are characterized by extraordinary resistance to heat and mechanical working, not possible with any of the stabilizers proposed in the published prior art except perhaps for the lead compound stabilizers, which discolor when exposed to hydrogen sulfide. They are capable of being mechanically worked at 310°–340° F. for periods of one-half to one hour; at 340–380° F. for periods up to ten minutes; and for periods of a minute or two at 400° C., as on a high speed calender. This permits of a much better fusion of the resin than is obtained in ordinary working, resulting in films and other products of outstanding clarity, homogeneity and strength, and in much higher permissible calender speeds. Accordingly, the present invention is of especial application to the calendering of thin flexible vinyl films in which the final bank of resin in the calender is in the neighborhood of 380°–400° F., a practice not practical on a commercial basis with conventional stabilizers, except as above noted, with the lead stabilizers which have other serious disadvantages. Such films will usually range in thickness from 0.002 to 0.010 inch and, when unpigmented, will have much greater clarity than similar films calendered at the lower temperatures which must be used with conventional stabilizers. In any event, the films will have improved color stability and tenacity. The severity of calendering operations at these high temperaures will be appreciated when it is realized that the stock must be compounded and warmed up in banbury and warm-up mills and that the edge trimmings of the calendered film (which will generally accumulate as slow-cooling gobs at the film temperature at the trimmers) must be recycled if the process is to be economic. In film calendering operations referred to hereinbelow, it is to be understood that these rigorous practices were employed.

The stabilizers of this invention are also useful in the calendering or other modes of hot fabrication of thicker sheeted products, such as artificial leathers, calender-coated fabrics and the like. The stabilizers may also be used in resins for melt extrusion and hot molding processes.

With the foregoing general discussion in mind, there are given herewith detailed examples of the practice of this invention. All parts given are by weight except as otherwise indicated.

EXAMPLE I

A–1. Preparation of diorganotin dimercaptides:

| | | |
|---|---|---|
| Diorganotin oxide (per Table III), gram-mole | | .21 |
| Mercaptothiazole derivative (per Table III) gram-mole | | .4 |
| Toluene | ml | 250 |

A–2. Preparation of organotin trimercaptides:

| | | |
|---|---|---|
| Organostannic acid (per Table III), gram-mole | | .017 |
| Mercaptothiazole derivative (per Table III) gram-mole | | .050 |
| Toluene | do | 100 |

A series of compositions was made up in accordance with the foregoing schedule, using as the stabilizer each of the organotin mercaptides prepared as above described and tabulated below. In each case the listed ingredients, together with the compound under test, in the proportions listed in the recipe above were thoroughly mixed together and placed on a laboratory roll mill at 320° F. Milling was continued for two minutes, at the end of which time the gauge was set at 0.025 inch and the sheet removed from the mill and cooled.

Five one-inch-square specimens of each of the compositions prepared as above described were hung vertically in a forced-draft oven maintained at 170° C. Specimens of each of the compositions were removed at intervals of 15, 30, 60, 90 and 120 minutes of exposure in the oven, and were rated subjectively as to color and extent of deterioration by the operator, which ratings are set forth herewith in Table III opposite the tabulation of the preparation of the compound under test. By way of contrast, a composition in accordance with the above formula, but omitting any stabilizer, showed marked deterioration after as short a time as 15 minutes in the oven, see the last item in the table.

Table III

| Constitution of Product | | Properties of Mercaptide | Amount of Mercaptide Used (parts by weight) | Vinyl Resin Stability Test | | | | | Run No. |
|---|---|---|---|---|---|---|---|---|---|
| Tin Compound Used | Mercaptothiazole Derivative Used | | | Color of Test Specimen After Exposure in Oven For— | | | | | |
| | | | | 15 min. | 30 min. | 60 min. | 90 min. | 120 min. | |
| Dimethyl-tin Oxide. | 2-Mercaptobenzothiazole. | M. P. 106° C. | 1 | off white | off white | pale straw | Straw, brown edge. | straw, brown edge. | 1 |
| | | | 2 | do | do | do | straw | straw | 2 |
| | Tetrahydro 2-Mercapto-benzothiazole. | M. P. 122° C. | 2 | muddy white. | dirty straw | dirty brown | brown | brown | 3 |
| Dibutyl-tin Oxide. | 2-Mercapto-benzothiazole. | M. P. 185° C. | 2 | white | off white | pale straw | straw | tan, brown edge. | 4 |
| | o-Phenyl mercapto-benzothiazole. | dark brown liquid. | 2 | pale straw | pale straw | straw | do | light brown | 5 |
| | 2-Mercaptothiazolene. | white solid | 2 | white | do | light red-brown. | brown | dark brown | 6 |
| Phenyl | 2-Mercapto-benzothiazole. | M. P. 158° C. | 1 | off white | off white | pale straw | smoky straw | do | 7 |
| | | | 2 | do | do | do | straw | do | 8 |
| | 2-Mercapto-thiazolene. | yellow viscous liquid. | 2 | pale straw | pale straw | smoky straw | black | black | 9 |
| Butyl-stannic acid. | 2-Mercapto-benzothiazole. | viscous, light orange liquid. | 2 | faint straw | light straw | straw | tan | light brown | 10 |
| Lorol stannic acid. | 2-Mercapto-benzothiazole. | viscous liquid, $n_D^{20}$ 1.5973. | 2 | off white | pale straw | do | do | do | 11 |
| Blank | no stabilizer | | 0 | tan | dark tan | brown | dark brown | dark brown | 12 |

A series of mercaptides was synthesized by reacting various tin compounds with various mercapitothiazole derivatives as indicated in Table III. In the case of the diorganotin mercaptides, the reactants were taken in the proportions indicated in recipe A–1 above; in the case of the organotin trimercaptides, the reactants were taken in the proportions indicated in recipe A–2 above. In all instances, the tin compound and mercaptothiazole derivative, together with toluene, were refluxed for about three hours at atmospheric pressure under a condenser provided with a water trap for retaining any evolved water while returning the toluene to the reaction mixture. The reaction mixture was then cooled to room temperature, filtered to remove any insoluble matter, and heated to strip off the toluene. The residue was taken as a substantially pure organotin mercaptide. In certain cases, indicated in Table III, the product was recrystallized from toluene.

B. Testing in vinyl chloride resin:

| | Parts |
|---|---|
| Vinyl chloride resin (copolymer of 97% vinyl chloride 3% vinylidene chloride) | 100 |
| Di(2-ethylhexyl)phthalate | 46 |
| Tricalcium phosphate | 1 |
| Silicate pigment | 1 |
| Stabilizer compound under test | 1 or 2 (per Table I) |

Each of the stabilized compositions tabulated above was calendered out onto a film .005 inch thick on a calender, the rolls of which were maintained at 350° F. Excellent fusion of the resin in the films was obtained, which films had much greater transparency and clarity than is obtained in films calendered at conventional lower temperatures. No trouble was encountered from decomposition of any of the formulations, and the finished films were not discolored by exposure to hydrogen sulfide gas.

From the foregoing general discussion and detailed specific examples, it will be evident that this invention provides novel stabilized vinyl chloride resin compositions having outstanding resistance to deterioration by heat and mechanical working, which resistance permits them to be calendered and otherwise fabricated at extremely high temperatures, with consequent increased rate of production of the film on a given set of calendering equipment and enhanced homogeneity of the product. The stabilizers are of low toxicity and allergenic tendency, do not discolor when exposed to hydrogen sulfide and may be cheaply and readily prepared from reliably and abundantly available starting materials.

What is claimed is:

1. A composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

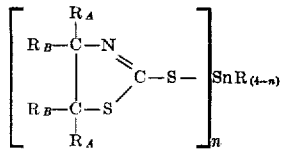

wherein $n$ is an integer from 2 to 3 inclusive, R, independently in each occurrence, represents an organic radical consisting of, and containing, from 1 to 22 carbon atoms, hydrogen, carbon-carbon single bonds, carbon-hydrogen bonds, up to 11 aromatic ring carbon-carbon double bonds, and up to 4 innocuous structures selected from the group consisting of carbon-carbon triple bonds, aliphatic carbon-carbon double bonds, ether linkages, thioether linkages, carboxylic ester groups bonded to carbon atoms, fluorine atoms bonded to carbon atoms and halogen atoms bonded to aromatic ring carbon atoms, each R being linked to the tin atom in the formula hereinabove by one of its carbon atoms, $R_A$, independently in each occurrence, represents a substituent selected from the group consisting of the hydrogen atom, alkyl, cycloalkyl, aryl and aralkyl groups, and, in the case of any two radicals $R_A$ on adjacent carbon atoms, hydrocarbon chains extending from the position occupied by one of said two radicals $R_A$ to the position occupied by the other of said radicals $R_A$ and constituting, with said two adjacent carbon atoms, cyclic structures, and $R_B$, independently in each occurrence, represents a substituent selected from the group consisting of the hydrogen atom, alkyl, cycloalkyl, aryl and aralkyl groups, and, in the case of any two radicals $R_B$ on adjacent carbon atoms, an additional valence bond extending from the position occupied by one of said two radicals $R_B$ to the position occupied by the other of said two radicals $R_B$.

2. A composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

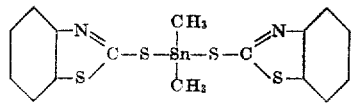

3. A composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

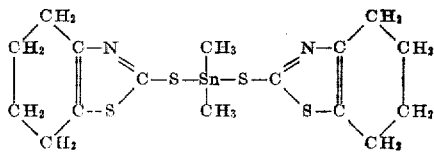

4. A composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

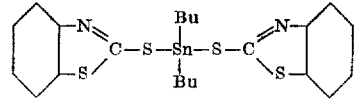

wherein the notation "Bu" represents an n-butyl group.

5. A composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

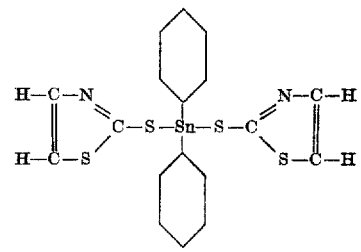

6. A composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

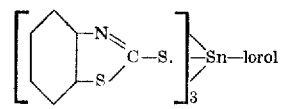

wherein the notation "lorol" denotes the mixed alkyl radicals derived from cocoanut oil fatty acids.

7. A thin, flexible film of a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

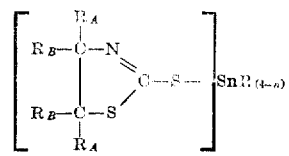

wherein $n$ is an integer from 2 to 3 inclusive, R, independently in each occurrence, represents an organic radical consisting of, and containing, from 1 to 22 carbon atoms, hydrogen, carbon-carbon single bonds, carbon-hydrogen bonds, up to 11 aromatic ring carbon-carbon double bonds, and up to 4 innocuous structures selected from the group consisting of carbon-carbon triple bonds, aliphatic carbon-carbon double bonds, ether linkages, thioether linkages, carboxylic ester groups bonded to carbon atoms, fluorine atoms bonded to carbon atoms and halogen atoms bonded to aromatic ring carbon atoms, each R being linked to the tin atom in the formula hereinabove by one of its carbon atoms, $R_A$, independently in each occurrence, represents a substituent selected from the group consisting of the hydrogen atom, alkyl, cycloalkyl, aryl and aralkyl groups, and, in the case of any two radicals $R_A$ on adjacent carbon atoms, hydrocarbon chains extending from the position occupied by one of said two radicals $R_A$ to the position occupied by the other of said radicals and constituting, with said two adjacent carbon atoms, cyclic structures, and $R_B$, independently in each occurrence, represents a substituent selected from the group consisting of the hydrogen atom, alkyl, cycloalkyl, aryl and aralkyl groups, and, in the case of any two radicals $R_B$ on adjacent carbon atoms, an additional valence bond extending from the position occupied by one of said two radicals $R_B$ to the position occupied by the other of said two radicals $R_B$.

8. A thin, flexible film of a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

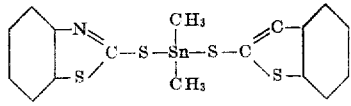

9. A thin, flexible film of a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

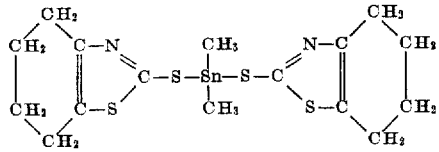

10. A thin, flexible film of a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

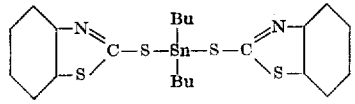

wherein the notation "Bu" represents an n-butyl group.

11. A thin, flexible film of a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

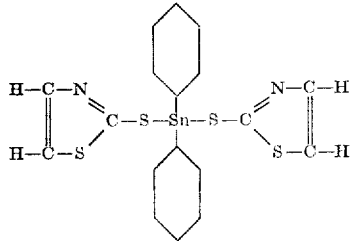

12. A thin, flexible film of a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

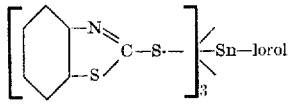

wherein the notation "lorol" denotes the mixed alkyl radicals derived from cocoanut oil fatty acids.

13. Process which comprises calendering, at temperatures from 315° to 400° C., a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

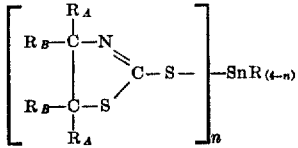

wherein $n$ is an integer from 2 to 3 inclusive, R, independently in each occurrence, represents an organic radical consisting of, and containing, from 1 to 22 carbon atoms, hydrogen, carbon-carbon single bonds, carbon-hydrogen bonds, up to 11 aromatic ring carbon-carbon double bonds, and up to 4 innocuous structures selected from the group consisting of carbon-carbon triple bonds, aliphatic carbon-carbon double bonds, ether linkages, thioether linkages, carboxylic ester groups bonded to carbon atoms, fluorine atoms bonded to carbon atoms and halogen atoms bonded to aromatic ring carbon atoms, each R being linked to the tin atom in the formula hereinabove by one of its carbon atoms, $R_A$, independently in each occurrence, represents a substituent selected from the group consisting of the hydrogen atom, alkyl, cycloalkyl, aryl and aralkyl groups, and, in the case of any two radicals $R_A$ on adjacent carbon atoms, hydrocarbon chains extending from the position occupied by one of said two radicals $R_A$ to the position occupied by the other said radicals $R_A$ and constituting, with said two adjacent carbon atoms, cyclic structures, and $R_B$, independently in each occurrence, represents a substituent selected from the group consisting of the hydrogen atom, alkyl, cycloalkyl, aryl and aralkyl groups, and, in the case of any two radicals $R_B$ on adjacent carbon atoms, an additional valence bond extending from the position occupied by one of said two radicals $R_B$ to the position occupied by the other of said two radicals $R_B$.

14. Process which comprises calendering, at temperatures from 315° to 400° C., a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

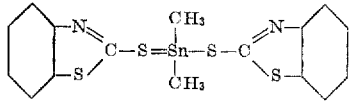

15. Process which comprises calendering, at temperatures from 315° to 400° C., a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

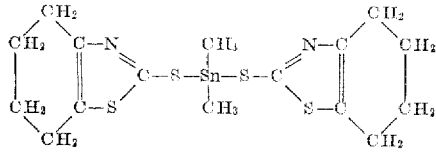

16. Process which comprises calendering, at temperatures from 315° to 400° C., a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

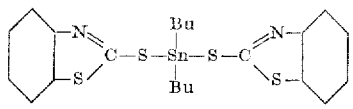

wherein the notation "Bu" represents an n-butyl group.

17. Process which comprises calendering, at temperatures from 315° to 400° C., a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

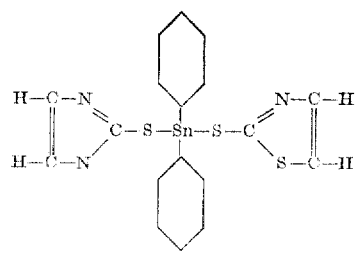

18. Process which comprises calendering, at temperatures from 315° to 400° C., a composition stable to heat and mechanical working comprising a resin selected from the group consisting of polymers of vinyl chloride and copolymers thereof with other unsaturated compounds copolymerizable therewith containing at least 60%, based on the weight of said copolymers, of vinyl chloride copolymerized therein, together with from 0.2 to 5.0%, based on the weight of the resin in said composition, of an organometallic tin mercaptide of the formula

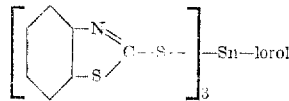

wherein the notation "lorol" denotes the mixed alkyl radicals derived from cocoanut oil fatty acids.

No references cited.

U. S. DEPARTMENT OF COMMERCE

PATENT OFFICE

CERTIFICATE OF CORRECTION

Patent No. 2,731,441                                    January 17, 1956

Eugene P. Stefl et al.

It is hereby certified that error appears in the printed specification of the above numbered patent requiring correction and that the said Letters Patent should read as corrected below.

Column 1, line 31, for "applicant's" read --applicants'--; column 2, line 32, for "bonds (optionally)," read --bonds, (optionally)--; line 72, for "(" read --(III)--; column 5, line 35, for "account" read --amount--; column 6, line 11, after "piperylene" insert a comma; line 28, for "0.3" read --.03--.

Signed and sealed this 4th day of March 1958.

(SEAL)
Attest:
KARL H. AXLINE
Attesting Officer

ROBERT C. WATSON
Commissioner of Patents